United States Patent
Adegbola et al.

(10) Patent No.: US 8,719,721 B1
(45) Date of Patent: May 6, 2014

(54) SELECTION OF BOREHOLE AND WELL DATA FOR VISUALIZATION

(71) Applicants: Olufemi A. Adegbola, Dubai (AE); Emad Al-Ajmi, Jaber Al-Ali (KW); Peter J. Guijt, Spring, TX (US); Sebastian Enrico Ramirez, Houston, TX (US); William W. Scott, The Woodlands, TX (US); Joel W. Tarver, Houston, TX (US); Doron Hetz, Houston, TX (US)

(72) Inventors: Olufemi A. Adegbola, Dubai (AE); Emad Al-Ajmi, Jaber Al-Ali (KW); Peter J. Guijt, Spring, TX (US); Sebastian Enrico Ramirez, Houston, TX (US); William W. Scott, The Woodlands, TX (US); Joel W. Tarver, Houston, TX (US); Doron Hetz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/666,034

(22) Filed: Nov. 1, 2012

(51) Int. Cl.
*G06F 3/048* (2013.01)
*G06F 3/00* (2006.01)

(52) U.S. Cl.
USPC ........... 715/771; 715/772; 715/775; 715/782; 715/850; 715/852

(58) Field of Classification Search
USPC .................. 715/771, 772, 775, 782, 850, 852
See application file for complete search history.

(56) References Cited

U.S. PATENT DOCUMENTS

| | | | |
|---|---|---|---|
| 7,596,481 B2 | 9/2009 | Zamora et al. | |
| 7,603,264 B2 | 10/2009 | Zamora et al. | |
| 7,657,414 B2 | 2/2010 | Zamora et al. | |
| 8,199,166 B2* | 6/2012 | Repin et al. | 345/633 |
| 2005/0133272 A1* | 6/2005 | Huang et al. | 175/327 |
| 2009/0229819 A1* | 9/2009 | Repin et al. | 166/250.01 |
| 2011/0175899 A1* | 7/2011 | Bittar et al. | 345/419 |
| 2013/0043077 A1* | 2/2013 | Chen | 175/61 |
| 2013/0161096 A1* | 6/2013 | Benson et al. | 175/26 |

OTHER PUBLICATIONS

Chapman et al., "Meeting the Challenges of Oilfield Exploration Using Intelligent Micro and Nano-Scale Sensors", 2012 12the IEEE International Conference on Nanotechnology, Aug. 20-23, 2012, pp. 1-6.
Han et al., "Research on Downhole Multi-parameters Monitoring System", IEEE, Aug. 2012, pp. 1-4.
IP.com Journal, "IP Solutions with a Higher IQ", Mar. 2013, vol. 13, No. 38, pp. 1-3.

* cited by examiner

*Primary Examiner* — Nicholas Augustine
(74) *Attorney, Agent, or Firm* — Cantor Colburn LLP (57) ABSTRACT

A visualization system for providing a preview of data obtained in a borehole and available for selection includes a processor configured to process the data based on user input and instructions and provide output for display on a display device; a computer-readable medium configured to store the instructions, the instructions including commands to output values of two or more types of parameters at two or more depth values for display; and a user interface configured to facilitate selection of one or more of the two or more types of parameters for further visualization and processing.

17 Claims, 8 Drawing Sheets

SELECTION OF BOREHOLE AND WELL DATA FOR VISUALIZATION

BACKGROUND

During the process of drilling a well to explore and recover geologic resources, many measurements may be taken to determine conditions within the borehole and in the formation. Analysis of this data can make the drilling process more efficient and can provide insight into the potential productivity of a well. Although large volumes of data are collected, the data sets are currently not organized and visualized in a meaningful way. Thus, a high level of experience and expertise is required to ascertain meaningful information without lengthy additional processing. Consequently, techniques to improve the visualization of collected data would be appreciated in the drilling industry.

BRIEF SUMMARY

According to an aspect of the invention, a visualization system for providing a preview of data obtained in a borehole and available for selection includes a processor configured to process the data based on user input and instructions and provide output for display on a display device; a computer-readable medium configured to store the instructions, the instructions including commands to output values of two or more types of parameters at two or more depth values for display; and a user interface configured to facilitate selection of one or more of the two or more types of parameters for further visualization and processing.

BRIEF DESCRIPTION OF THE DRAWINGS

Referring now to the drawings wherein like elements are numbered alike in the several Figures.

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
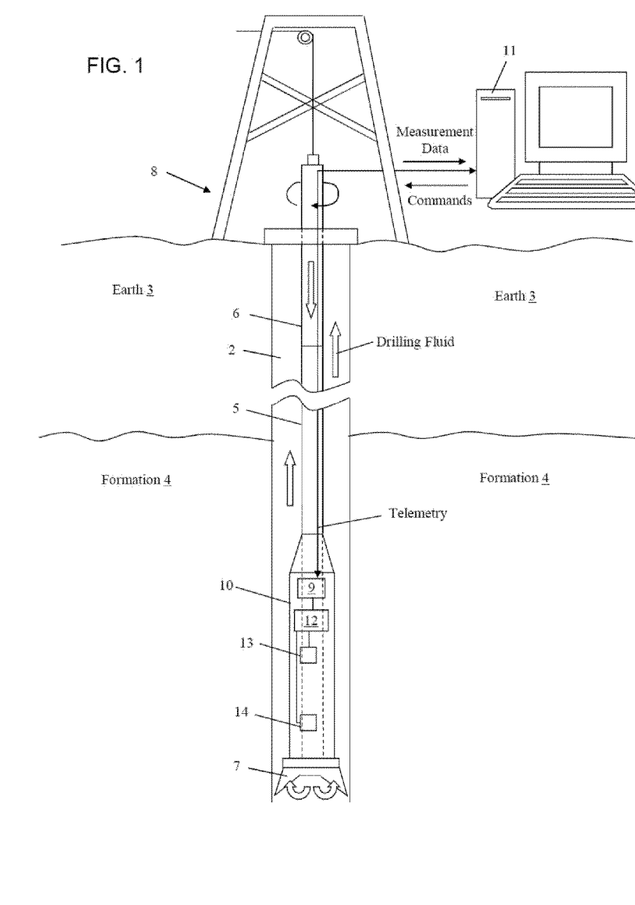
FIG. 1 illustrates a cross-sectional view of an exemplary embodiment of downhole tools disposed in a borehole penetrating the earth.

FIG. 1 illustrates a cross-sectional view of an exemplary embodiment of downhole tools 10 disposed in a borehole 2 penetrating the earth 3. The formation 4 represents any subsurface material of interest. The downhole tools 10 are conveyed through the borehole 2 by a carrier 5. In the exemplary embodiment shown by FIG. 1, the carrier 5 is a drill string 6 in an embodiment known as logging-while-drilling (LWD). Disposed at a distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. In alternate embodiments, the carrier 5 may be an armored wireline in an embodiment known as wireline logging. In either case, the downhole tools 10 measure various parameters that may be processed by downhole electronics 9. The measured data may instead or additionally be processed by a computer processing system 11 disposed at the surface of the earth 3. The computer processing system 11 may process recorded data in a post-processing environment or data may be transmitted to the computer processing system 11 via a telemetry interface while the downhole tools 10 are collecting measurements. In alternate embodiments, the computer processing system 11 may issue commands regarding the drilling process, further measurements and the like based on the data that is receives. The downhole tools 10 may record electrical, radioactive, magnetic, and other properties at different depths. Exemplary downhole tools 10 include a pressure transducer 12, density tool 13, and magnetic resonance imaging tool 14. The pressure transducer 12 provides pressure data at various depths of the borehole 2 over a period of time. In pressure transient analysis, depth, time, and pressure are all recorded. It should be understood that the downhole tools 10 could also include any number of sensors and measurement devices that work alone or in combination with each other.

Figure 2:
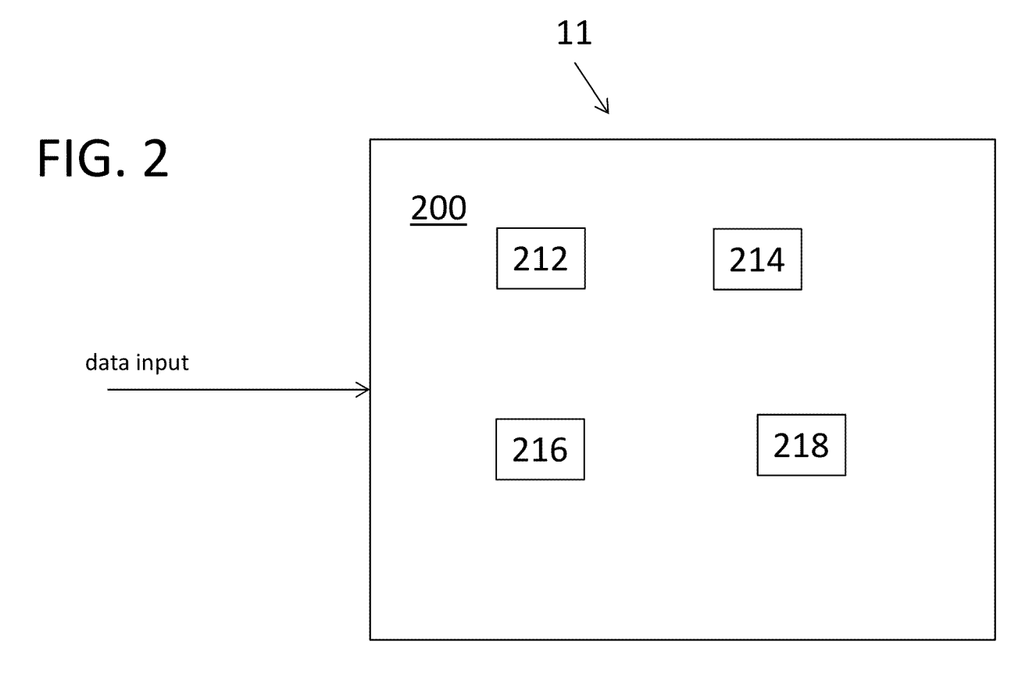
FIG. 2 is a block diagram of a visualization system according to an embodiment of the invention.

FIG. 2 is a block diagram of a visualization system 200 according to an embodiment of the invention. In particulate, the visualization system 200 detailed in the several embodiments below provides output that offers a preview to the complete set of data obtained by the downhole tools 10. The visualization system 200 includes one or more memory devices 212, one or more processors 214, a user interface 216, and an output device 218 that includes a display. In one or more embodiments, the visualization system is the computer processing system 11 shown at FIG. 1. The one or more memory devices 212 and one or more processors 214 communicate with each other and with the other parts of the visualization system 200 wirelessly or via one or more buses. As such, the different parts 212, 214, 216, and 218 may not be housed together but, instead, for example, the processor 214 may transmit processed data to the display device 218 over a network for display at a different location. The user interface 216 may include a pointer or other selection mechanism that facilitates user selection of one or more points in a display output by the display device 218. The one or more memory devices 212 store one or more applications that, when executed by the processor 214, process the incoming data and provide output in a format for display by the display device 218. The display may be an overview or preview of all the available data that allows a user to select particular data for further visualization and processing.

Figure 3:
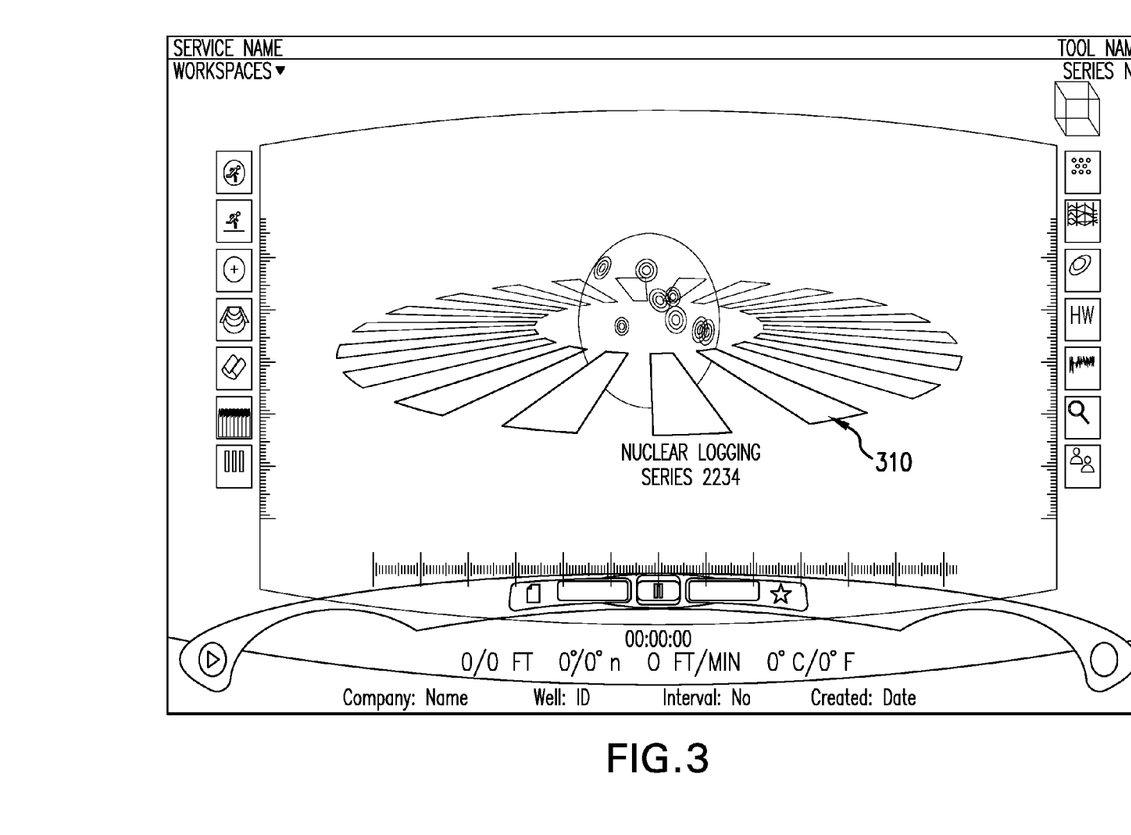
FIGS. 3 and 4 illustrate outputs of the data visualization system according to embodiments of the invention.
Figure 4:
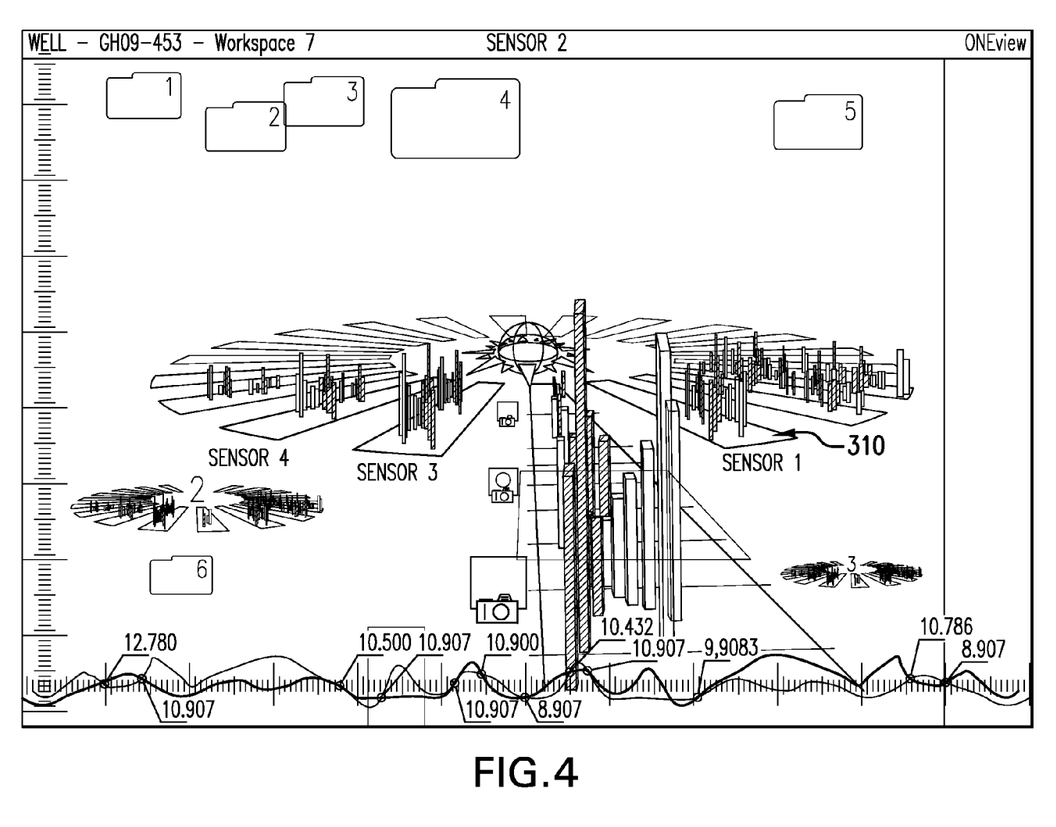

FIGS. 3 and 4 illustrate outputs of the data visualization system 200 according to embodiments of the invention. In the embodiments illustrated by both FIG. 3 and FIG. 4, a preview is provided of different parameters collected at different depths of the borehole 2. As shown in FIG. 1, each radial segment 310 or "spoke" displays data for one particular parameter at one or more available depths. The data displayed may be bookmarked data (detailed with reference to FIG. 9). That is, previously selected views of data (bookmarked data) may be displayed on one or more of the radial segments 310. Together, the radial segments 310 form a carousel of rotatable spokes. In alternate embodiments, more than one parameter may be shown on each spoke. For example, a bookmarked view may be a view of density and pressure at different depths with density and pressure denoted by different colors and the density and pressure values shown and line graphs. The depth values for each spoke may increase or decrease toward the center of the circle of radial segments 310 based on a user preference. FIG. 3 shows the parameter values through grayscale encoding. Alternate embodiments may display the parameter values coded by color. FIG. 4 shows the parameter values in three dimensions with a height of the shapes on the radial segments 310 representing the parameter value. The radial segments 310 may rotate automatically at a preset speed based on the processor 214 or may be rotated based on a user action using the user interface 216. In the embodiment of FIG. 4, the parameter values for the radial segment 310 closest to the perspective of the user are shown larger (zoomed in) as compared with values of other parameters on other radial segments 310. The data or bookmarked data shown on each radial segment 310 may be selected for further viewing by selecting the radial segment 310 with the user interface 216. The further viewing may include viewing the bookmarked data individually or following further processing by the processor 214 based on user selection.

Figure 5:
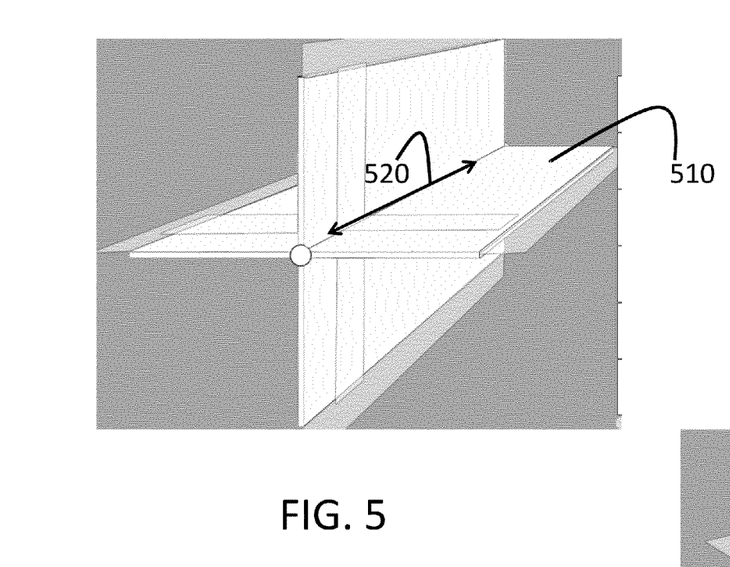
FIGS. 5-8 illustrate outputs of the data visualization system according to other embodiments of the invention.
Figure 6:
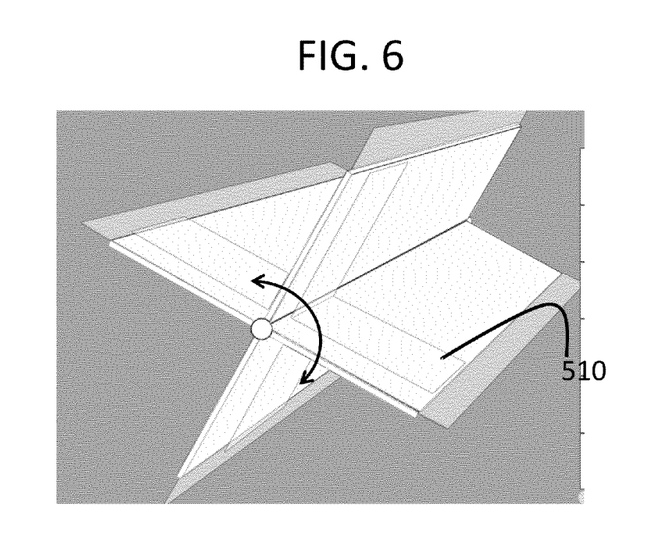
Figures 7, 8:
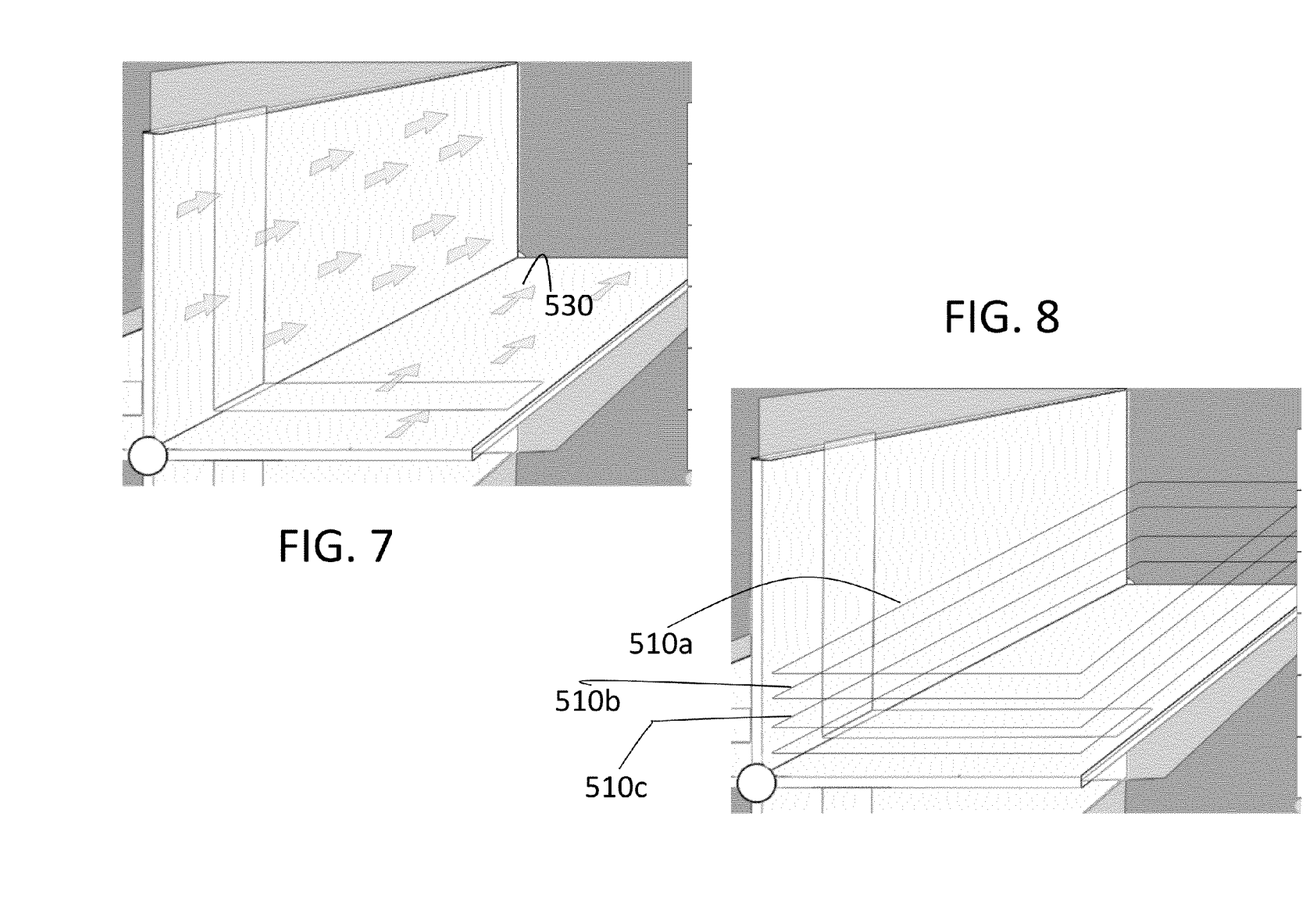

FIGS. 5-8 illustrate outputs of the data visualization system 200 according to embodiments of the invention. In the embodiments illustrated by FIGS. 5-8, a preview is provided of different parameters collected at different depths of the borehole 2. As discussed with reference to FIGS. 3 and 4, the preview may be of bookmarked views in alternate embodiments. As shown in FIG. 5, each plane 510 or "flap" displays data for one or more parameters at one or more depths. Together, the planes 510, which may be orthogonal planes, form a carousel of rotatable flaps. The depth values on each flap may increase or decrease in a direction away from the viewer along the radial line 520 at the center of the planes 510. As FIG. 6 illustrates, the planes 510 may be rotated about the radial line 520, based on a user action through the user interface 216 or automatically at a set rate based on processor 214 control, to make each plane 510 more visible in turn. FIG. 7 illustrates a zoom feature and data being displayed in a streaming format. Based on a user selection through the user interface 216, the display of the output device 218 may be zoomed, for example, on one set of orthogonal planes 510 as shown. In addition, one or more parameters may be displayed as streaming data over the plane 510. That is, values for one or more parameters at a set of depth values (the range may be pre-set or user selected) is displayed at a time, and additional values for additional depths are streamed over the plane 510. The streaming may be for increasing or decreasing depth values in the direction indicated by the arrows 530 or in a direction opposite to that indicated by the arrows 530. FIG. 8 illustrates that parameter values may be stacked in parallel planes 510a, 510b, 510c, for example. The display in FIG. 8 is further zoomed from that shown by FIG. 7. The data or bookmarked data may be selected with the user interface 216 for further viewing. The further viewing may include viewing the bookmarked data individually or following further processing by the processor 214 based on user selection.

Figure 9:
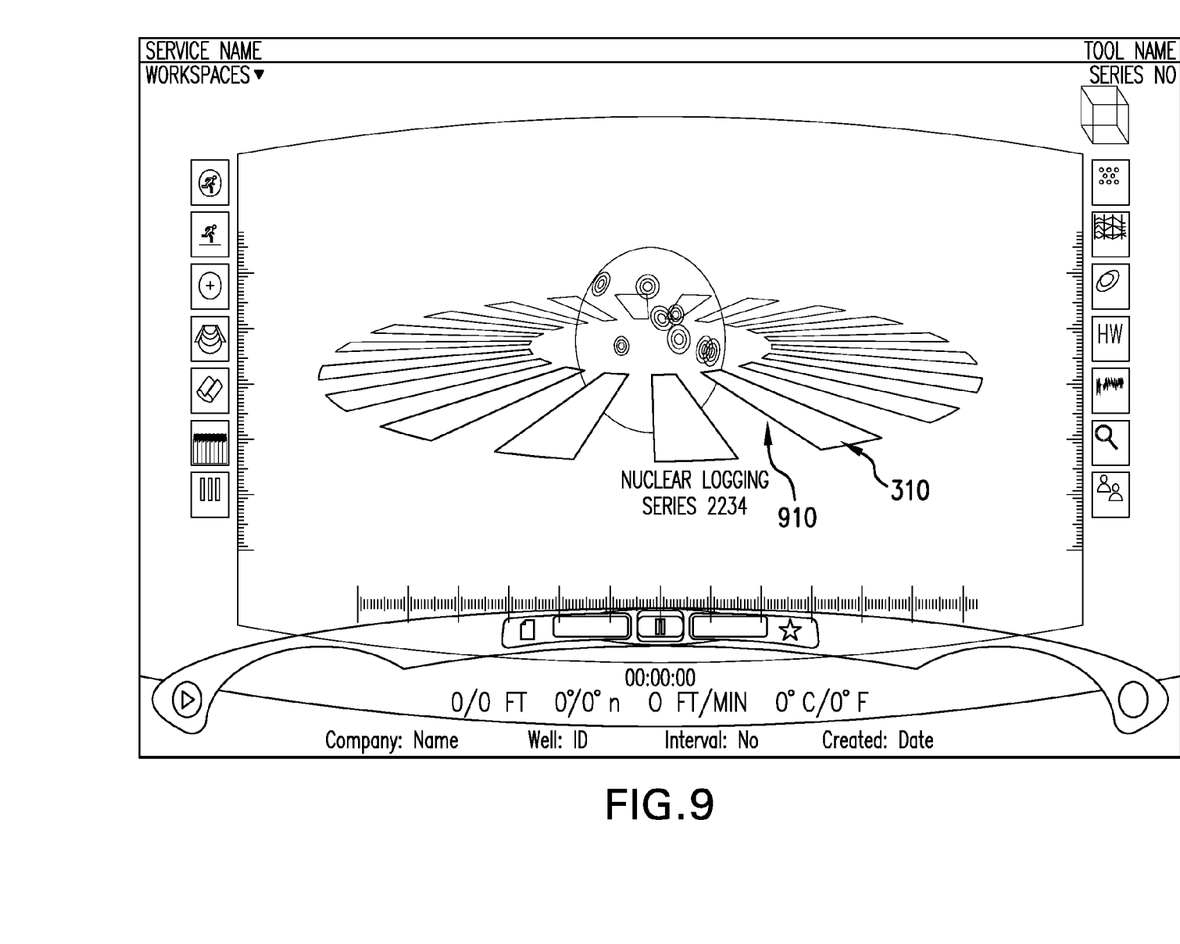
FIG. 9 illustrates bookmark selection according to an embodiment of the invention.
Figure 10:
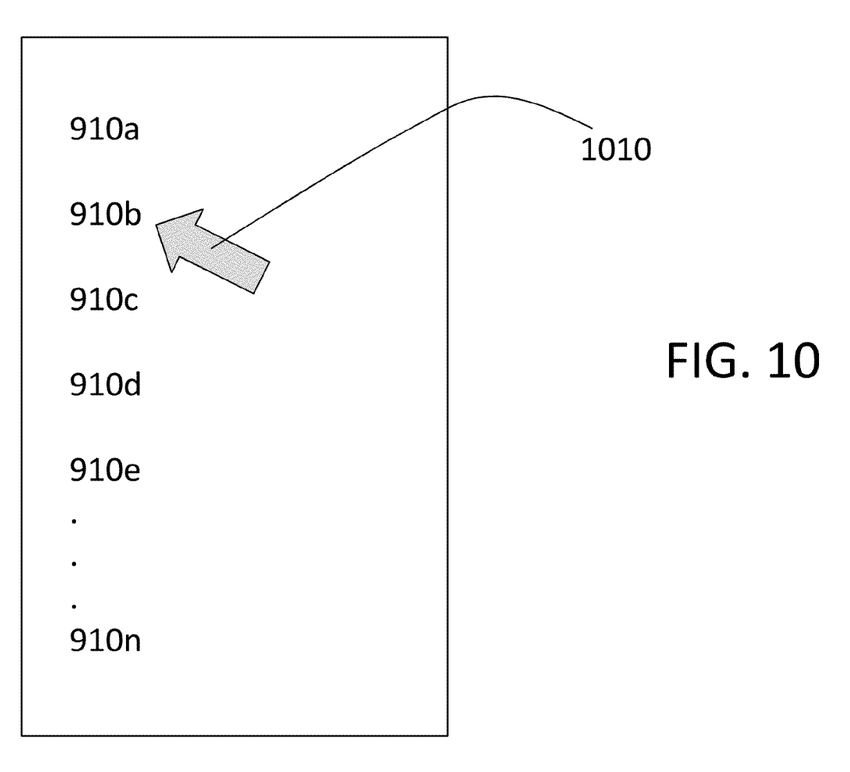
FIG. 10 illustrates a bookmark selection interface according to an embodiment of the invention.

FIGS. 9 and 10 illustrate bookmark 910 selection and a bookmark 910 selection interface 1010, respectively, according to embodiments of the invention. The user interface 216 facilitates the selection of one or more bookmarks 910 in the various views discussed with reference to FIGS. 3-8. For example, a user may use the user interface 216 to set a bookmark 910 at a depth value in one of the radial segments 310, as shown at FIG. 9. Bookmarks 910 may be set by an operator, via the user interface 216, at a depth value, for a time of capture of the data, for a time of last use of a data set, for a particular orientation shown on the display, or for any other discernible (selectable) characteristics output by the output device 218. Using the various preview displays shown by FIGS. 3-8, the user may set any number of bookmarks 910. When two or more bookmarks 910 have been set, a bookmark selection interface 1010 is available, as shown at FIG. 10. The bookmark selection interface 1010 facilitates selection of bookmarks 910 from a list or other grouping that is organized based on any number of the characteristics indicated by the bookmarks 910. That is, the list of bookmark 910 entries (910a through 910n, as shown in FIG. 10) may be sorted by type of view, depth value, time of capture of data, etc. Bookmark 910 selection based on the views shown by FIGS. 3-8 was discussed with reference to those figures. FIG. 10 illustrates a list view of bookmarks 910. Once a bookmark 910 is selected via the bookmark selection interface 1010, that bookmark 910 may be applied to the current view. For example, if the user is currently viewing porosity data output by the display device 218, selection of a bookmark 910 relating to streaming data view, as shown by FIG. 7, for example, would apply the streaming data view to the porosity data being viewed. Rather than applying the bookmark 910 to the current view, the user may select to replace the current view by a view indicated by the selected bookmark 910.

While one or more embodiments have been shown and described, modifications and substitutions may be made thereto without departing from the spirit and scope of the invention. Accordingly, it is to be understood that the present invention has been described by way of illustrations and not limitation.

In support of the teachings herein, various analysis components may be used, including a digital and/or an analog system. For example, the downhole electronics 9 or the computer processing system 11 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A visualization system for providing a preview of data obtained in a borehole and available for selection, comprising:
   a processor configured to process the data based on user input and instructions and provide output for display on a display device, the processor outputting values of two or more types of parameters at two or more depth values within the borehole for display as radial segments with each radial segment displaying the values of one of the two or more types of parameters at the two or more depth values;
   a computer-readable medium configured to store the instructions, the instructions including commands to output the values of two or more types of parameters at the two or more depth values for display of one of the two or more types of parameters at the two or more depth values within the borehole on each radial segment of two or more radial segments; and
   a user interface configured to facilitate selection of one or more of the two or more types of parameters for further visualization and processing.

2. The system according to claim 1, wherein the processor arranges the values on each of the radial segments such that a value at a greater depth is farther from a center of the radial segments than a value at a shallower depth.

3. The system according to claim 1, wherein the processor arranges the values on each of the radial segments such that a value at a greater depth is closer to a center of the radial segments than a value at a shallower depth.

4. The system according to claim 1, wherein the processor outputs each radial segment as a two-dimensional image with each value encoded in a corresponding color.

5. The system according to claim 1, wherein the processor outputs each radial segment as a three-dimensional image for display with a value indicated on a plane perpendicular to a plane formed by the radial segment.

6. The system according to claim 1, wherein, automatically at a preset rate, the processor rotates the display of the radial segments.

7. The system according to claim 1, wherein, based on the user input, the processor rotates the display of the radial segments.

8. The system according to claim 1, wherein the processor outputs a radial segment among the radial segments that is closest to a viewing perspective of a user for display in a zoomed-in format.

9. A visualization system for providing a preview of data obtained in a borehole and available for selection, comprising
   a processor configured to process the data based on user input and instructions and provide output for display on a display device, the processor outputting values of two or more types of parameters at two or more depth values within the borehole for display on two or more planes that form an angle with each other with each plane displaying the values of one of the two or more types of parameters at the two or more depth values;
   a computer-readable medium configured to store the instructions, the instructions including commands to output the values of the two or more types of parameters at the two or more depth values for display of one of the two or more types of parameters at the two or more depth values within the borehole on each plane of the two or more planes; and
   a user interface configured to facilitate selection of one or more of the two or more types of parameters for further visualization and processing.

10. The system according to claim 9, wherein the two or more planes are orthogonal planes.

11. The system according to claim 9, wherein, based on user selection via the user interface, a view of the two or more planes is rotated in the display device.

12. The system according to claim 9, wherein, based on user selection via the user interface, the values of the two or more types of parameters are displayed as streaming data on the two or more planes.

13. The system according to claim 9, wherein the values of each of the two or more types of parameters are displayed on respective planes that are stacked in parallel.

14. The system according to claim 1, wherein the user interface facilitates a user-defined bookmark indicating a view of the one or more of the two or more types of parameters.

15. The system according to claim 14, wherein the user interface further facilitates a selection of one or more bookmarks specifying one or more views for display on the display device.

16. The system according to claim 15, wherein two or more bookmarks are listed as a bookmark list for selection by a user.

17. The system according to claim 16, wherein, based on a selection of a bookmark from the bookmark list, the view indicated by the bookmark selected by the user is used to update a current display or replace the current display of the display device.

* * * * *